Patented June 2, 1942

2,285,130

UNITED STATES PATENT OFFICE 2,285,130

PROCESS FOR MANUFACTURING ALCOHOL

Herman Schwarcz, New York, N. Y., assignor of fifteen per cent to Julian J. Wittal, New York, N. Y.

No Drawing. Application March 17, 1939, Serial No. 262,570

6 Claims. (Cl. 195—16)

This invention relates to manufacturing alcohol and has for its main object to provide a novel process for this purpose in which the net alcohol return from the same amount of raw material will be considerably higher than by the present methods now used for manufacturing alcohol.

Another object of my invention is to provide a process as characterized hereinbefore which will use less expensive materials than the present alcohol manufacturing processes.

Still another object of this invention is to provide a process which will use a less amount of some of the expensive materials for those harder to obtain and hard to handle, than is the case with the process now in use.

Still another object of my invention is to provide a novel important alcohol manufacturing process which will be easier to practice and operate and which will make the manufacturing plant more independent of some of the materials to be obtained from the outside than the present processes.

Still a further object of my invention is to provide a process of this type which will be easier to control and more certain in operation and of results than the alcohol manufacturing processes now in use.

Still further objects of my invention will be apparent as the specification of the same proceeds.

To manufacture alcohol according to my novel process, first I make a so-called "leaven" as follows:

For every hectoliter of leaven to be manufactured, I take 8 kilograms of rye finely ground, and 20 kilograms of well crushed young green sprouted barley, the sprouts of which were approximately 1 centimeter or somewhat longer. I have a preferred method of preparing said sprouted barley which I will explain hereinafter.

The rye flour and the crushed sprouted barley are mixed well in water sufficient to make said hectoliter (like in an appropriate tank, well known in this art) at 36° Reaumur, so that no lumps will remain and then the mixture is heated to about 50° Reaumur.

The mixture is now permitted to rest for an hour at said 50° R. so that it will start to turn to sugar, saccharize. Tests are now taken to examine for sugar content which should be as desired and which will be rectified to that degree, by well known methods.

The saccharized mixture is now cooled to 24° R., strained and then examined for the natural acid content which should be about seven tenths of an acid degree, (0.7°) which should be rectified if found less. The rectification again may be made by any appropriate method, well known to those versed in this art; usually diluted sulphuric acid is used.

The sulphuric acid is first permitted to cool before adding the same to the mixture which is kept at 24° R. and now we add the yeast to the mixture. About 1 kilogram pressed fresh yeast is added to every hectoliter leaven mixture, said yeast to be well mixed and distributed in a small amount of water of 26° R. temperature. The resulting leaven yeast mixture is now further cooled down to 18, 17, or 16° R. according to the prevailing conditions at the place of manufacturing and then permitted to rest and ferment for 24 hours, during which time the mixture should warm up to 23-24° R. During this time we also test the mixture for acids to discover and control possible harmful strange acids, etc., and we also test for sugar which at the end of this period should be one-third of the original. That is, if for instance, the original sugar content was 15°, then at the end of the 24 hour fermentation, the sugar content should be only 5°. I want to remark that measuring of the acid will be done by titration. I preferably use normal sodium hydroxide (NaOH), of which 40 grams in a chemically substantially pure condition are added to one liter of distilled water, and litmus paper is used as an indicator. Measuring of the sugar concentration is done by the Balling scale of saccharimetry.

The means of determining acidity in degrees is as follows:

By adding 14 cc. of sulphuric acid ($H_2SO_4$) of 66° Bé. concentration to 100 liters of mash, it will require 0.1 cc. of $n/1$ (NaOH) sodium hydroxide to neutralize it, and this will mean that the acidity of the mash is 0.1 degree. For example, if I wish to acidify a mash of 100 liters to 0.7, I will add $7 \times 14$ cc.$=98$ cc. or $7 \times 25$ grams$=175$ grams, of sulphuric acid.

The resulting mixture is what I call the first "yeast mash" a medium prepared as described and containing fermenting mash.

The alcohol is preferably manufactured of rye or of corn while, of course, other raw materials may be used, as potato. The necessary amount of such raw materials are boiled in a usual alcohol manufacturing boiler, well known in this art preferably with steam over 3-3½ atmospheric pressure for 3 hours or if it did not open up yet sufficiently, then for sometime longer. Three liters of water are used for every kilogram of raw material.

I now take a mixer into which I add for every 100 kilograms of rye or corn 2½ kilograms greer crushed sprouted barley, 3 kilograms millet flour of "non-sprouted" natural millet grain and about 6 liters water at 25° R. for every kilogram of the mixture, that is, barley and millet, and let the same be stirred and mixed in the mixer for a few minutes before allowing the corn or rye mass to be blown into the mixer.

Now, the boiled mass of corn or rye is blown by a steam pressure from its boiler into the mixer under constant stirring and mixing and during this time, we add 3.3 kilograms of said millet flour in thin continuous stream to every 100 kilograms of raw material.

The resulting produce I call the sweet mash and from this product we now take off a desired amount for the alcohol manufacturing to be used as the leaven in the following days in my process as will be more fully explained presently. The product is again tested for sugar or acids and is cooled to 24° R. Whereupon the said first yeast mash is now added to this sweet mash. It will be understood that before adding said first yeast mash, a desired and necessary amount thereof is reserved to be used with said leaven in the following days of manufacturing according to my process.

The mixture is now transferred into a fermentation tank and further cooled as necessary to 18-15° R.

This mixture I call the sour mash and is permitted to ferment from 36 to 70 hours according to the raw materials and the other conditions of the case, whereupon I arrive to a mash which I call the ripe mash and which now may be distilled in any of the usual devices and by any of the usual methods for alcohol distillation.

The steps so far described are only for the first days of the actual alcohol manufacturing and for the start of my process.

The second day of starting my process, I also prepare for the third day thereof, that is, I prepare the leaven and my so-called "yeast mash" for the third day's boiling and fermentation of the desired amount of rye, corn, etc.

The preparation on the second day, and the boiling, mixing, and fermentation operations on the third day, are different from the preparations on the first day, and the boiling, mixing, and fermentation steps described for the first and second days, respectively, hereinbefore.

On the second day, I do not prepare leaven with ready-made yeast, as was described for the first day, but for leaven to be used for the third day's operation, I take about 10% in volume measured by the mass to be prepared on the third day, of the sweet mash prepared on the second day and described hereinbefore, that is about 40 liters of the second day sweet mash for every 100 kilograms of rye or corn to be prepared for distillation on the third day. Similarly, for yeast, to be used with this leaven, I take an amount equivalent to the 10% thereof, that is, about 4 liters for every 40 liters thereof, of the said first yeast mash.

These amounts of the second day sweet mash and first yeast mash, respectively, will be mixed and treated in the following manner:

Into a tank I place for every 100 liters of said reserved 40 liters of sweet mash, 6 kilograms of the said green sprouted barley, and 2 kilograms of the said millet flour. Then we add thereto the total of said 40 liters of the sweet mash at about 50° R. temperature. We permit it to rest and saccharize, then test it for sugar and for acids and rectified similarly as recited hereinbefore for preparing the first yeast mash on the first day. I remark that the acid content should be rectified now to (.9) nine-tenths of an acid degree. The mixture is again cooled to 24° R., the said first yeast mash (4 liters for every 40 liters sweet mash) is added and then further cooled to 16-18° R., or as necessary, and permitted to rest and ferment for 24 hours, similarly as has been done with said first yeast mash on the first day of my process.

The resulting mixture may be called the "second yeast mash" to be used on the third day of the process.

On said third day, the boiling of the raw material and the treatment thereof in the mixture and the adding of said second yeast mash are similar to the operations described for the second day and, after due fermentation, the third day's ripe mash will also be distilled as will be understood.

On the third day I again prepare a yeast mash mixture which may be called the "third yeast mash" for the fourth day fermentation and distilling operations, entirely similar as has been described hereinbefore, by taking 40 liters of sweet mash of the third day's product for every 400 liters to be boiled on the fourth day or approximately for every 100 kilograms of raw materials to be treated on the fourth day, and I also reserve on said third day, 4 liters of said second yeast mash for every said 40 liters.

To prepare the yeast mash on the third day to be used on the fourth day which I now call the third yeast mash, I treat said 40 liters and 4 liters similarly to their treatment described for the second day in the preparation of said second yeast mash with the exception, however, that before mixing said 40 liters and 4 liters, I add into said mixing tank 4½ kilograms of said sprouted barley instead of the 6 kilograms I added on the second day and I add 2½ kilograms of millet flour instead of the 2 kilograms on the second day.

The treatment of this mixture for the preparation of the third yeast mash to be used on the fourth day is otherwise entirely identical to the treatment described for the second day. The boiling, mixing, fermentation, and other operations on the fourth day with said third yeast mash will also be entirely identical for such operations described for the second and third day.

On the fourth day I again reserve said 40 liters and 4 liters of the sweet mash and of the third yeast mash, respectively, to be prepared into a so-called fourth yeast mash to be used on the fifth day, as will be understood.

The preparation of this fourth yeast mash is again similar to the preparation of the second and third mashes, with the exception that I now add to said 40 liters and 4 liters, only 4 kilograms of sprouted barley, but 3 kilograms of millet flour.

On and after the fifth day, the preparation of the later mashes will be entirely identical to the preparation of said fourth yeast mash, and, of course, the boiling, mixing and other operations will be also identical to those for the previous days and my process of manufacturing alcohol from said raw materials may go on in this manner indefinitely.

I may also practice my process for manufacturing alcohol in a modified form, in which case, still less yeast and less of said yeast mash preparations will be needed and the whole process will be further simplified, made less expensive and still further improved from commercial and management points of view.

In this modified form, the first and second day operations will generally be the same as has been described hereinbefore with the exception, however, that said second yeast mash will not be produced by 10% of said sweet mash and 10% thereof said first yeast mash, but I will prepare a second yeast mash with 12% of the third day's mass to be handled, that is, about 48 liters for every 400 liters. The mash on said third day will otherwise be handled similarly as described hereinbefore, allowed to ferment for six hours, after which it will be divided into two halves in two different tanks.

In said modified practice of my process, on the third day I also will prepare another similar amount of main mash that is, the general mass or raw materials, water, etc., to be handled and boiled and treated in the same identical manner as has been described hereinbefore, with the exception however, that no yeast mash mixture will be added to this mass, but instead of the yeast mash mixture, a certain amount of alcohol will be added thereto. This alcohol is calculated in the following manner. The amount of alcohol which would be produced by 8% of the yeast mash mixture described hereinbefore for the various days will be figured out, and 5% thereof will be taken, diluted water with 4 times its amount will be added into said main mash or mass, while the same is cooled to 40° R. temperature in a continuous slow manner.

It will be seen that if said second prepared mash or main mash had been treated similarly to said first main mash, 10% of said yeast mash mixture would have to be added thereto, and similarly 10% of said yeast mash mixture would have been added to said first mash, in the earlier form of my process. The yeast mash mixtures added to said two batches would have been 20%, while as has been described, only 12% yeast mash mixture will be added to the first batch and none to the second batch.

It will be seen that ultimately, the two batches will be combined, and according to the earlier practice of my process, 8% of the usual yeast mash mixture would be missing. To replace the action of the 8% yeast mash mixture, I discovered the cheaper and simpler method of said 5% of the alcohol, corresponding to said 8% of yeast mash mixture.

It will be seen that alcohol being produced in the plants itself, and being easily handled, its use will again greatly cheapen and facilitate my process, while the ultimate result will be the same.

Now, said second batch will also be divided into two halves and each half will be added to a half of said first batch.

I also want to remark, however, that in preparing said second batch of mash, and before the same is blown into the mixer, I add into the mixer thereof for every 100 kilograms of raw materials the following ingredients:

| | Kilograms |
|---|---|
| Millet flour, that is, of non-sprouted millet | 5 |
| Sprouted barley | 2 |
| Sprouted oats or sprouted millet | 2 |

My novel and preferred method of preparing sprouted barley, mentioned hereinbefore, is as follows:

The barley is soaked in water into which is added a small amount of lime until it becomes grayish in color. After three hours, this water is removed, and the purpose of this preliminary soaking in lime water is to disinfect the grains and prevent their rotting or other deterioration during the later operations. Fresh water is now added on the barley and it is further soaked to 32 to 37 hours according to the hardness of the grains, whereupon it is removed from the soaking water and piled and permitted there to sprout and warm-up until the temperature is about 18° R. When this temperature is reached, then the barley has to be turned over but it remains in a pile. After this, the barley will be turned over every morning and every evening and the piles are made wider and wider, and of course, of less and less depth according to the growth of the sprouts or shoots and at every such turning, the barley will be wetted with about 1½ to 2 liters of water for every 100 kilograms, so that it shall not be too wet, neither too dry. On the third day and after four times we add 1½ grams of potassium permanganate into the water for every 1½–2 liters when wetting the barley, so as to insure its freedom from harmful growth, changes, bacilli, etc. This will be continued until the shoots are 1 centimeter or over in length.

My process, according to numerous experiments and large scale operations thereof, will produce about 67 to 68% alcohol recovery from the starch in the raw materials, while to my knowledge, the present standard and most efficient method of distilling alcohol will produce only about 60%, therefore, my process will approximately produce 10% more alcohol from the same amount of raw materials than the best processes now in use.

It also will be seen that my process will use per 100 kilograms raw materials, approximately one-fourth (¼) of the sprouted barley used by other processes, and it will replace the part missing from the same by a smaller amount of millet flour.

The millet flour is cheaper and it need not any treatment, while the sprouted barley necessitates about 15 days of preparation. In a similar manner, less yeast is needed in the second form of my process in which part of the yeast is replaced by alcohol produced by the plant itself.

My novel process for preparing sprouted barley is also different from the one now in use in the best and most efficient distilleries, it has many advantages thereover, it will prevent any deterioration or any harmful growth and products in the sprouted barley and it gives a product which according to my experience is particularly adapted to my process.

I also want to remark that still another modification of my process is possible, wherein the leaven mixture will produce its own natural lactic acid. In this form of my process, the various steps of preparing the leaven mixture are the same as described hereinbefore, but such mixture will now be permitted to rest for 24 hours at 42° to 47° R., after which the lactic acid will be developed therein. Before cooling, however, the mixture will be heated up to 60° R. for one hour to sterilize the same and then it should have 1.8 to 3 degrees content of lactic acid. If it is less than 1.8 degrees, then the best method is to add 4 liters of leaven mixture which has rested said 24 hours, but before said boiling, for every hectoliter of the mash to be prepared.

Finally, my experience has been that the alcohol produced by my process is of better quality than those produced by methods used at present.

What I claim as new, is:

1. In a process for manufacturing alcohol, the steps of preparing a first yeast mash, preparing a first mash, adding sprouted barley and millet flour thereto, reserving a portion of said first mash, reserving a portion of said first yeast mash, adding the rest of said first yeast mash to said first mash and fermenting and distilling the mixture, then adding barley and non-sprouted millet flour to said reserved portion of said first mash, adding the reserved portion of said first yeast mash, permitting the resulting mixture to ferment for about 24 hours, thereby producing a second yeast mash, reserving a portion of said second yeast mash, preparing a second mash, adding sprouted barley and non-sprouted millet flour to said second mash, adding said second yeast mash to said second mash and fermenting and distilling the same, forming a third yeast mash from reserved part of said second yeast mash and said second mash, reserving a portion of said third yeast mash, preparing a third mash, adding sprouted barley and millet flour to said third mash, reserving a part thereof, adding said third yeast mash thereto, and fermenting and distilling the same, forming a fourth yeast mash with the reserve parts of said third mash and said third yeast mash, reserving a portion of said fourth yeast mash, preparing a fourth mash, adding sprouted barley and millet flour to said fourth mash, and again reserving a portion of this mash, adding said fourth yeast, fermenting and distilling said fourth mash, and so continuing indefinitely with similar repeated preparatory operations in about every 24 hours.

2. In a process, as set forth in claim 1, the amounts of sprouted barley and millet flour added to said second yeast mash being about 6 kilograms and 2 kilograms, respectively, for every 100 kilograms raw material to be distilled, and the respective amounts for said third yeast mash being 4½ kilograms and 2½ kilograms, and for said fourth yeast mash being four kilograms and 3 kilograms, respectively, and for the fifth and consecutive yeast mashes they being the same as for said fourth yeast mash.

3. In a process, as set forth in claim 1, the reserved portion of each mash being about 10 per cent in volume of the next succeeding mash to be prepared and the reserved portion of the yeast mash being about 10 per cent of the reserved portion of the mash.

4. In a process, as set forth in claim 1, the steps of preparing two equal batches of mash in each 24 hours of operation, adding 12 per cent of the previous mash and 1.2 per cent of the previous yeast mash to the yeast mash of one of said batches, not adding any yeast mash to the second one of said batches, but adding 5 kilograms of millet flour, 2 kilograms of sprouted barley and 2 kilograms of sprouted oats thereto, for about every 100 kilograms of raw materials to be distilled used therein, adding 5 per cent of alcohol of the amount of alcohol equivalent to that produced by 8 per cent of the mash, missing from the amounts of yeast mashes if the yeast mashes defined in claim 5 had been added to each batch of mash, dividing each batch of mash into two halves, mixing the half of the respective batches in two pairs and fermenting and distilling the two mixtures of the two respective halves.

5. In a process for manufacturing alcohol, the step of adding not sprouted millet flour containing yeast to the mash, thereby accelerating the alcoholic fermentation and increasing the yield in alcohol.

6. In a process for manufacturing alcohol from starch-containing materials, the step of adding millet flour to the mash, in order to convert the starch into sugar.

HERMAN SCHWARCZ.